United States Patent
Montague et al.

(10) Patent No.: US 6,353,635 B1
(45) Date of Patent: Mar. 5, 2002

(54) METHOD FOR SIMULTANEOUSLY CONTROLLING MULTIPLE DEVICES USING A SINGLE COMMUNICATION CHANNEL

(75) Inventors: David S. Montague, Bellevue; Harjit Singh, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/249,213

(22) Filed: Feb. 12, 1999

(51) Int. Cl.[7] ............................. H04N 7/12; H04N 7/00
(52) U.S. Cl. .................. 375/240.26; 348/460; 455/3.03
(58) Field of Search ............. 375/240.26; 348/461–468, 348/473–474, 480, 460; 386/95–96, 100; 360/18, 27, 51; 370/498; 455/4.1, 68, 151.1, 151.4, 418–419, 3.03; 725/93, 116, 146

(56) References Cited

U.S. PATENT DOCUMENTS

| | | |
|---|---|---|
| 3,493,674 A | 2/1970 | Houghton |
| 3,743,767 A | 7/1973 | Bitzer et al. ................ 348/463 |
| 3,891,792 A | 6/1975 | Kimura |
| 3,900,887 A | 8/1975 | Soga et al. ................. 348/479 |
| 3,993,861 A | 11/1976 | Baer |
| 4,186,413 A | 1/1980 | Mortimer .................... 348/473 |
| 4,207,704 A | 6/1980 | Akiyama |
| 4,540,176 A | 9/1985 | Baer |
| 4,599,644 A | 7/1986 | Fischer |
| 4,660,033 A | 4/1987 | Brandt |
| 4,665,431 A | 5/1987 | Cooper ...................... 348/480 |
| 4,729,563 A | 3/1988 | Yokoi |
| 4,771,344 A | 9/1988 | Fallacaro et al. |
| 4,800,431 A * | 1/1989 | Deering ...................... 348/719 |
| 4,807,031 A | 2/1989 | Broughton et al. |
| 4,840,602 A | 6/1989 | Rose |

(List continued on next page.)

FOREIGN PATENT DOCUMENTS

| | | | |
|---|---|---|---|
| EP | 0 710 022 A2 | 5/1996 | ............ H04N/7/08 |
| WO | WO 91/10490 | 7/1991 | ............ A63H/3/28 |
| WO | WO 92/19073 | 10/1992 | ............ H04N/7/08 |

OTHER PUBLICATIONS

Waramahaputi et al., "LCR:a linear conflict resolution algorithm for local/metropolitan area networks", IEEE, Apr. 1988, pp. 357–366.*

Chaddha, N., "A software only scalable video delivery system for multimedia applications over heterogeneous networks", IEEE, Oct. 1995, pp. 404–407.*

*Primary Examiner*—Vu Le
(74) *Attorney, Agent, or Firm*—Ronald M. Anderson

(57) ABSTRACT

A Bandwidth Resolution Conflict component combines control data for multiple controlled devices into a unified control data signal that can be transmitted on a single communication channel. To resolve any bandwidth conflicts, the BCR component implements one or more of the following techniques to resolve the bandwidth conflicts: (1) regenerating the control data signal by increasing at least one compression parameter used in creating the first and second segments of control data; (2) interleaving the control data signal by replacing two adjacent frames of the control data segment with a single frame designated as a repeat frame; (3) reorganizing the control data by moving a frame of control data segment into an unoccupied frame in the control data signal; (4) pre-stuffing the control data signal by moving a portion of the control data to frames in which the moved control data will accumulate for delayed performance in a buffer in one of the controlled devices; and (5) selecting one of the controlled device for data starving based on predefined selection criteria and deleting one or more frames of the control data for the selected controlled device. One or more of these techniques may be applied individually or consecutively until all bandwidth conflicts are resolved.

21 Claims, 7 Drawing Sheets

U.S. PATENT DOCUMENTS

| | | |
|---|---|---|
| 4,846,693 A | 7/1989 | Baer |
| 4,847,699 A | 7/1989 | Freeman |
| 4,847,700 A | 7/1989 | Freeman |
| 4,864,607 A | 9/1989 | Mitamura et al. |
| 4,866,701 A * | 9/1989 | Giacopelli et al. .......... 370/411 |
| 4,930,019 A | 5/1990 | Chu |
| 4,949,327 A | 8/1990 | Forsse et al. |
| 5,021,878 A | 6/1991 | Lang |
| 5,108,341 A | 4/1992 | DeSmet |
| 5,179,719 A * | 1/1993 | Hidaka ...................... 455/3.03 |
| 5,198,893 A | 3/1993 | Lang |
| 5,270,480 A | 12/1993 | Hikawa |
| 5,655,945 A | 8/1997 | Jani |
| 5,898,397 A * | 4/1999 | Murray ....................... 341/176 |

* cited by examiner

METHOD FOR SIMULTANEOUSLY CONTROLLING MULTIPLE DEVICES USING A SINGLE COMMUNICATION CHANNEL

REFERENCE TO RELATED APPLICATIONS

This application is related to U.S. application Ser. No. 08/795,710 entitled "PROTOCOL FOR A WIRELESS CONTROL SYSTEM" filed on Feb. 4, 1997; U.S. application Ser. No. 08/794,921 entitled CONTROLLER AND ASSOCIATED MECHANICAL CHARACTERS OPERABLE FOR CONTINUOUSLY PERFORMING RECEIVED CONTROL DATA WHILE ENGAGING IN BIDIRECTIONAL COMMUNICATIONS OVER A SINGLE COMMUNICATIONS CHANNEL (as amended) filed on Feb. 4, 1997; and U.S. application Ser. No. 08/885,385 entitled METHOD AND SYSTEM FOR ENCODING DATA IN THE HORIZONTAL OVERSCAN PORTION OF A VIDEO SIGNAL filed on Jun. 30, 1997; all of which are assigned to a common assignee and incorporated into this specification by reference.

TECHNICAL FIELD

This invention relates to communication systems and, more particularly, relates to a method for using a single communication channel to simultaneously transmit control data to multiple controlled devices. In particular, the controlled devices may be mechanical characters that use the control data to produce synthesized speech and coordinated movement, which causes the controlled devices to behave as characters in a corresponding video program.

BACKGROUND OF THE INVENTION

Controlled-device systems using mechanical characters that move and talk as characters in a corresponding video program have been developed for entertainment and educational purposes. For example, one such system intended for use by for small children includes mechanical "BARNEY," "ARTHUR," and "DW" toy characters that move and talk as characters in a live or taped broadcast of the BARNEY television program. In addition, other mechanical characters representing other characters for this and other video programs may be released in the future.

In this type of controlled-device system, having a variety of different characters is desirable because it gives different children different characters to interact with. For example, one child may interact with the "BARNEY" toy, while another interacts with the "ARTHUR" toy, while another interacts with the "DW" toy, etc. It is also advantageous for a variety of different toys to be available so that children have a selection of toys to choose from and collect. Moreover, in a progressive learning system, it is advantageous to have a series of toys associated with different skills so that a child can progress through the skills learned by interacting with the different toys.

Once multiple characters are deployed, however, keeping them all moving and talking in approximate synchronism with the corresponding video program can be difficult. More specifically, transmitting a sufficient amount of control data in real-time with the video program becomes increasingly difficult as the number of characters and the complexity of the program content increases. This can become particularly difficult when multiple characters speak and/or move simultaneously. For example, in a scene depicting a orchestra, one character may move as a conductor directing the orchestra while several other characters simultaneously sing different parts. In general, video programs often contain scenes in which several characters speak and/or move simultaneously or in rapid succession.

Due to spectrum scarcity and cost considerations, prior controlled-device systems use a single wireless communication channel to transmit control data to multiple controlled devices. The control schemes for these systems typically rely on addressing techniques to direct control data to specified characters. Although these systems work well, they limit the total amount of control data that can be transmitted at any one time to the bandwidth of the communication channel. Of course, the underlying programming of typical video content material is not scripted with bandwidth limitations in mind for controlledcharacter entertainment and educational systems. As a result, the bandwidth of the communication channel often turns out to be insufficient to carry the desired amount of control data.

One solution to this problem is to increase the number of communication channels used to transmit control data to the controlled devices. This is an expensive and, for existing systems, an impractical approach. Another option is to "data starve" controlled devices that need data when the single communication channel is transmitting control data to another device. This solution is somewhat lacking in performance, however, because certain controlled devices may perform well while other perform poorly or sporadically. As a result, the children playing with the poorly performing controlled devices may become frustrated or bored.

There is, therefore, a need for an improved system for simultaneously controlling multiple controlled devices using a single communication channel. There is a further need for controlled devices that respond appropriately to the control data transmitted on the single communication channel.

SUMMARY OF THE INVENTION

The present invention meets the needs described above by providing a method for combining control data for multiple controlled devices into a unified control data signal that may be transmitted on a single communication channel. Although the control data signal may be stored in virtually any type of computer-readable medium, it is typically encoded on video tape in the horizontal overscan portion of the video signal in approximate synchronism the video program. This allows the control data signal to be read from video tape and transmitted to the controlled devices in approximate synchronism with the display of the video program on a display device. As a result, the controlled devices may be made to move and speak as characters in the corresponding video program. Alternatively, for live broadcasts the unified control data signal may be constructed in real time and encoded into horizontal overscan portion of the video signal as the signal is created and broadcast in a live transmission.

The invention may be implemented by a computer system that combines the control data for multiple devices into the unified control data signal. Combining the control data into the unified control data signal involves the resolution of bandwidth conflicts that occur when attempting to drive multiple controlled devices simultaneously. Specifically, the invention employs five techniques that may be applied individually or in combination to resolve bandwidth conflicts: (1) regenerating the control data signal to increase the applied compression, (2) interleaving control data frames using repeat frames, (3) reorganizing the control data by moving a conflicting frame into an available frame, (4)

pre-stuffing the control data buffers for one or more controlled devices, and (5) data starving one or more controlled devices in accordance with predefined criteria. For each segment of the control data signal, one or more of these techniques may be applied individually or consecutively until all bandwidth conflicts are resolved. In addition, steps (1) and (2) may be combined into a single technique, for example by increasing the compression threshold on one frame so that it becomes identical (or nearly identical) to an adjacent frame, and then combining those two adjacent frames into a single frame designated as a repeat frame.

In addition, the producer of the controlled-device content material may select among these techniques to allocate the available bandwidth in a desired manner. That is, certain bandwidth resolution techniques have associated adverse effects or "performance penalties" for the affected controlled devices. For example, increasing the compression of control data used to synthesize speech degrades the accuracy of the audio response. Similarly, interleaving speech frames using repeat frames or by reorganizing the position of speech frames in the control data signal can cause slight warbling in the audio response. And deleting control data has the obvious affect of failing to provide the intended data to a particular controlled device. The orderly bandwidth resolution techniques of the present invention give the producer of the controlled-device content material the ability to resolve bandwidth conflicts in an strategic manner, typically by taking into account how the various controlled devices will be affected by the resulting performance penalties.

The invention also provides controlled devices that are configured to respond appropriately to the unified control data signal described above. That is, the controlled devices identify repeat frames and store these frames twice in their control data buffers. This gives the speech synthesizer duplicate speech data to play in response to the repeat frames. If the controlled device's data buffer is full, however, the repeat frames is simply ignored, which gives the controlled device an opportunity to "catch up" when its performance lags behind its control data stream.

Although gradual terminations of the audio response played by a controlled device can be built into the control data signal for planned terminations of audio control data, there is no way to pre-configure the unified control data signal for unexpected terminations of audio control data, such as those occurring when the control data transmitter is shut off suddenly. This sort of abrupt termination of audio control data can cause the speaker in the controlled device to emit a loud "pop." To solve this problem, the controlled devices respond gracefully to the termination of audio data by fading out gradually, rather than terminating abruptly.

Generally described, the invention provides a control data signal and a computer-implemented method for creating the signal. This control data signal is typically created by a bandwidth conflict resolution (BCR) component running on a computer system. The BCR component receives first and second segments of control data for transmission to first and second controlled device, respectively, during a time interval. The BCR component combines the first and second segments of control data into a unified control data signal that is transmittable on a single communication channel during the time interval. The BCR component then outputs the control data signal for transmission to the first and second controlled devices. For example, the BCR component may store the control data signal on a video tape in approximate synchronism with a video program for subsequent playback. Alternatively, the BCR component may encode the control data signal into a live video feed for immediate broadcast.

The BCR component combines the first and second segments of control data into the unified control data signal by identifying bandwidth conflicts in the control data signal. In response to the bandwidth conflicts, the BCR component implements one or more of the following techniques to resolve the bandwidth conflicts: (1) regenerating the control data signal by increasing at least one compression parameter used in creating the first and second segments of control data; (2) interleaving the control data signal by replacing two adjacent frames of the control data segment with a single frame designated as a repeat frame; (3) reorganizing the control data by moving a frame of control data segment into an unoccupied frame in the control data signal; (4) prestuffing the control data signal by moving a portion of the control data to frames in which the moved control data will accumulate for delayed performance in a buffer in one of the controlled devices; and (5) selecting one of the controlled device for data starving based on predefined selection criteria and deleting one or more frames of the control data for the selected controlled device. As noted previously, steps (1) and (2) may be combined into a single technique by increasing the compression threshold on one frame so that it becomes identical (or nearly identical) to an adjacent frame, and then combining those two adjacent frames into a single frame designated as a repeat frame.

The invention also provides a controlled device configured for responding to control data to behave as a character in a corresponding video program. The controlled device responds to repeat frames in the control data signal by receiving a frame of control data and determining whether its control data buffer is full. If the control data buffer is not full, the controlled device stores the frame of control data in the control data buffer and determines whether the frame of control data is designated as a repeat frame. If the frame is designated as a repeat frame, the controlled device determines whether the control data buffer is full after the control data has been stored in the control data buffer. If the control data buffer is not full after the control data has been stored in the control data buffer, the controlled device stores the frame of control data in the control data buffer a second time.

The controlled device is also configured to respond gracefully to control data shortages by checking a control data buffer for the presence of a current frame of control data for producing an audible response signal. If the control data buffer does not include the current frame of control data, the controlled device retrieves a previous frame of control data for producing an audible response signal and replays the previous frame of control data at a reduced volume. The controlled device then stores the previous frame of control data at the reduced volume in the control data buffer as the current frame of control data. This allows the audio response generated by the controlled device to fade out gradually when the control data terminates unexpectedly.

That the invention improves over the drawbacks of the prior art and how it accomplishes the advantages described above will become apparent from the following detailed description of the exemplary embodiments and the appended drawings and claims.

DETAILED DESCRIPTION

Figure 1A:
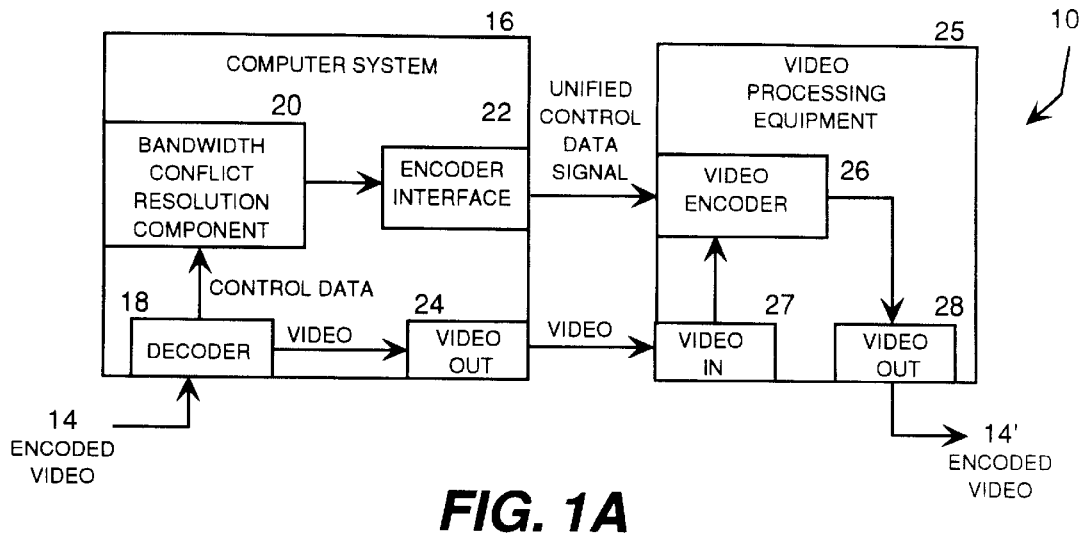
FIG. 1A is a block diagram illustrating a system for creating a unified control data signal and outputting it for live broadcast or storage on video tape.

The present invention may be embodied in a control data processing system that operates in conjunction with a wireless communication protocol that enables unidirectional communications in a simplex environment, or bidirectional communications in a duplex environment, between a controller and one or more controlled devices. The controller receives or generates video data and associated control data that may include voice synthesis coefficients and motor movement coefficients for the controlled devices. The video data drives a display device to depict a scene, and the control data drives the controlled devices so that the controlled devices behave as characters in the scene depicted on the display device. To synchronize the control data with the corresponding video program, a control data signal is typically encoded in the horizontal overscan region of the video signal to create an encoded video signal. The control data signal can then be extracted from the encoded video signal and transmitted to the control data in real time as the video program is displayed on a display device.

Each controlled device recognizes messages directed to that device and for parsing these messages into control signals for a number of end effectors, such as speech synthesizers, servo motors, lights, heat sources, pumps, etc. The content of messages for, and the set of end effectors in, a particular controlled device may be changed so that the system is forwardly compatible for new controlled devices using the protocol.

According to the communication protocol, the controller assigns subchannels to the controlled devices so that several devices may be controlled simultaneously by a single controller. The use of subchannels advantageously reduces the bandwidth required so that synthesized speech and coordinated movement may be controlled in a plurality of low-cost devices using a single radio-frequency channel. In a duplex environment, the controller assigns a subchannel to a controlled device in an acquisition handshake that may include an acquisition message from the controller to the controlled device, a response message back to the controller, and a verification message to the controlled device.

The acquisition message typically includes a device code corresponding to a genus of controlled devices. Each controlled device of the genus includes a device identifier based on a random number in its response message so that the controller can distinguish among the responding devices. Alternatively, the device identifier may be either by an electronic tag set during manufacturing, such as an electronic serial number, or by user settings. As an optional feature for avoiding message collision, each controlled device of the genus may delay its response message by a delay interval based on a random number. The controller then acquires one of the responding devices by including that device's identifier in the verification message.

In particular, the controlled devices are generally configured to synthesize an audio response in accordance with LPC voice coefficients received from the controller. Each controlled device typically includes an elastic queue referred to as a "control data buffer" for storing received control data, which is read one frame at a time from the control data buffer at a frame rate that maintains approximate synchronism between the controlled device and the underlying video program in the encoded video signal. This allows the controlled device to pre-stuff the control data buffer so that the controlled device may generate voice sounds continuously while the controller sends control data to other controlled devices and receives reply data from the controlled devices.

The bidirectional communications described above are used to simultaneously control multiple controlled devices using a single radio-frequency channel. From time to time, this causes bandwidth conflicts among the several devices. To resolve these conflicts, the computer system that creates the encoded video signal (i.e., encodes to the control data into the horizontal overscan region of the corresponding video signal) includes a Bandwidth Conflict Resolution (BCR) component. This BCR component resolves any bandwidth conflicts to create a unified control data signal that may be transmitted on a single communication channel, such as a wireless communication frequency authorized for use by the controlled devices.

The BCR component is typically configured as an element of a computer system that receives an encoded video signal and regenerates the encoded video signal to include a unified control data signal in which the bandwidth conflicts have been resolved. Alternatively, the BCR component could receive the video signal and several control data streams (i.e., one for each of several characters to be controlled) separately, in which case the BCR component creates the encoded video signal in the first instance. This may be the case for live broadcasts or when an encoded-video program is initially taped. Regardless of the source of the control data, the resulting encoded video signal—with bandwidth conflicts resolved—may be stored in a computer memory, stored on video tape, or immediately transmitted in a live broadcast.

In addition, the BCR component could operate with other types of controlled devices, and need not create a control data signal that is carried in the horizontal overscan region of a corresponding video signal. For example, the BCR component could be used to control multiple controlled devices in a live or prerecorded setting without a corresponding video signal. Similarly, the resulting control data signal could be transmitted through any type of communication medium, such as a broadcast radio link, a telephone line, an Internet connection, over the radio, by closed-circuit television, and so forth.

It should also be understood that the control data signal could be synchronized with a corresponding video program through mechanisms other than encoding the control data signal in the horizontal overscan region of the video signal.

For example, the control data signal could be read out of a computer storage medium at a frame rate that maintains approximate synchronism between the controlled device and the underlying video program in the encoded video signal. Alternatively, the control data could be created in a parallel processor that clocks the control data through the processor at an appropriate frame rate. Many other uses of the unified control data signal, and mechanisms for synchronizing it with a desired counterpart, will become evident to those skilled in the art.

FIG. 1A is a block diagram illustrating a system 10 for creating a unified control data signal and outputting it for live broadcast or storage on video tape. The system 10 is configured to receive video data and associated control data in the form of an input encoded data stream 14. The system 10 includes a computer system 16 having a decoder 18 that extracts the control data from the horizontal overscan region of the encoded video signal 14. This control data may include control data streams for multiple controlled devices. To resolve any bandwidth conflicts in the control data, the decoder 18 passes the extracted control data to a Bandwidth Conflict Resolution (BCR) component 20, which combines the control data streams for the multiple controlled devices into a unified control data signal that can be transmitted on a single communication channel.

The BCR component 20 implements one or more of the following techniques to resolve bandwidth conflicts: (1) regenerating the control data signal by increasing at least one compression parameter used in creating the first and second segments of control data; (2) interleaving the control data signal by replacing two adjacent frames of the control data segment with a single frame designated as a repeat frame; (3) reorganizing the control data by moving a frame of control data segment into an unoccupied frame in the control data signal; (4) pre-stuffing the control data signal by moving a portion of the control data to frames in which the moved control data will accumulate for delayed performance in a buffer in one of the controlled devices; and (5) selecting one of the controlled device for data starving based on predefined selection criteria and deleting one or more frames of the control data for the selected controlled device.

For each segment of the control data signal, one or more of these techniques may be applied individually or consecutively until all bandwidth conflicts are resolved. In addition, steps (1) and (2) may be combined into a single technique by increasing the compression threshold on one frame so that it becomes identical (or nearly identical) to an adjacent frame, and then combining those two adjacent frames into a single frame designated as a repeat frame.

Once the unified control data signal has been created, the BCR component 20 passes the signal to an encoder interface 22, which outputs the unified control data signal. The decoder 18 simultaneously passes the corresponding video signal to a "video out" interface 24, which outputs the corresponding video signal. Video processing equipment 25 receives the control data at an encoder 26 and the video signal at a "video in" interface 27. The video signal is also passed to the video encoder 26, which encodes the unified control data signal into the horizontal overscan region of the video signal to create an output encoded video signal 14'. The video processing equipment 25 then outputs the encoded video signal 14' at a "video out" interface 28. From here, the encoded video signal may be recorded on video tape or broadcast directly to receiving equipment.

Figure 1B:
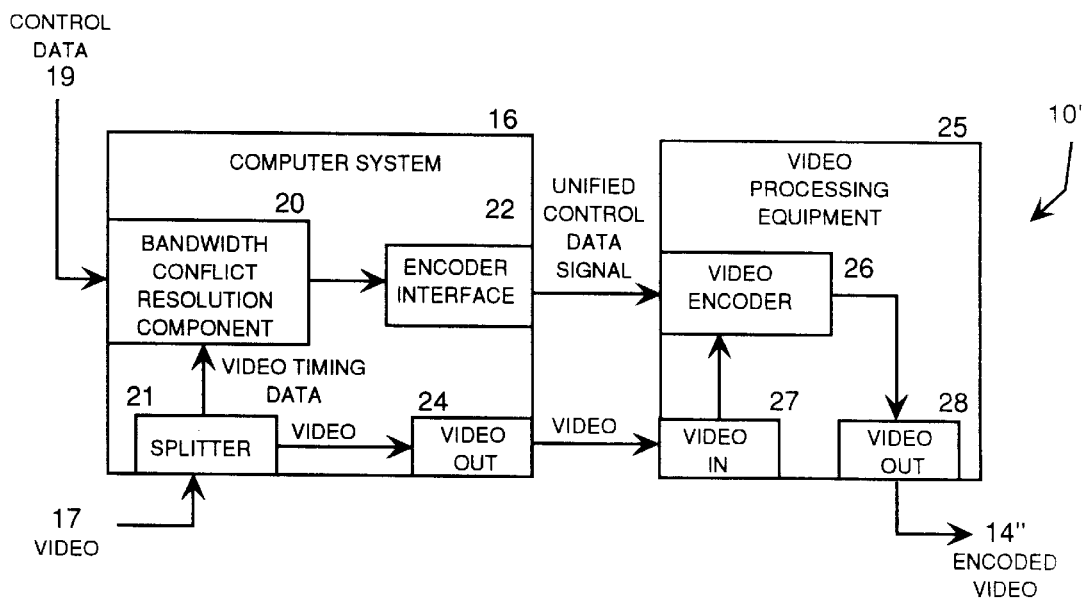
FIG. 1B is a block diagram illustrating an alternate system for creating a unified control data signal and outputting it for live broadcast or storage on video tape.

FIG. 1B is a block diagram illustrating an alternate system 10' for creating a unified control data signal and outputting it for live broadcast or storage on video tape. The system 10' is similar to the system 10 except that the system 10' is configured to receive a video data signal 17 that is separate from an associated control data signal 19. The BCR component 20 receives the control data signal 19, and a splitter 21 receives the video data signal 17. The splitter 21 provides the video data signal 17 to the video "out" interface 24 and also provides a video timing signal to the BCR component 20. The BCR component 20 then resolves bandwidth conflicts in the control data signal 19 to create the encoded video signal 14", as described with reference to FIG. 1A.

Thus, the system 10 described with reference to FIG. 1A may be used to resolve bandwidth conflicts in when the control data signal is synchronized with a corresponding video program by encoding the control data signal in the horizontal overscan region of the encoded video signal 14. Alternatively, the system 10' described with reference to FIG. 1B may be used when the control data signal 25 is separate from the corresponding video signal 23, for example when the control data signal is read out of a computer storage medium at a frame rate that maintains approximate synchronism between the controlled device and the corresponding video signal.

Figure 2:
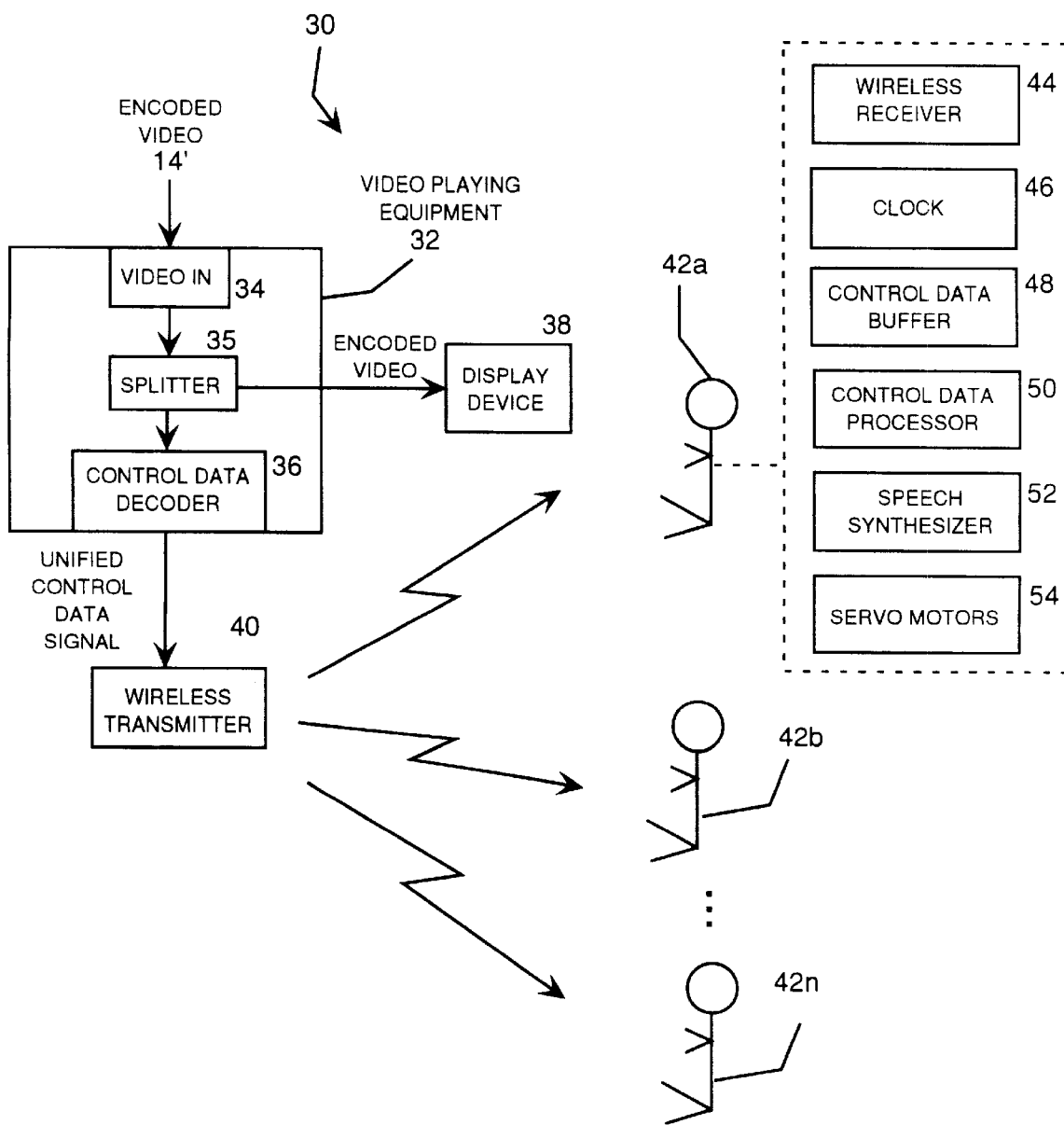
FIG. 2 is a block diagram illustrating a system for decoding a unified control data signal and transmitting the control data to multiple controlled devices.

FIG. 2 is a block diagram illustrating a system 30 for decoding a unified control data signal and transmitting the control data to multiple controlled devices. Whether the encoded video signal 14' is read from video tape or received in a live broadcast, video playing equipment 32 receives the encoded video signal at a "video in" interface 34. The "video in" interface 34 passes the encoded video signal 14' to a splitter 35, which simultaneously supplies the encoded video signal to a control data decoder 36 and to a video display device 38. The unified control data signal, which is encoded in the horizontal overscan portion of the video signal, does not affect the visual display of the video signal on the display device 38. The control data decoder 36 extracts the unified control data signal from the encoded video signal 14' and provides the signal to the wireless transmitter 40, which relays the control data to the appropriate controlled devices 42a–n.

It should be understood that the encoded video 14' signal as received by the video playing equipment 32 is propagating at a standard video frame rate and, as such, is suitable for driving the standard video display device 38. In addition, the control data signal includes address information for the various controlled devices 42a–n so that each device responds only to its intended control data. The video playing equipment 32 may be implemented within a personal computer, or it may alternatively be implemented in a special purpose set-top box. In future deployments, the video playing equipment 32 may be integrated directly into a television or multi-purpose entertainment center.

Each controlled device typically includes a wireless receiver 44, a clock 46, a control data buffer 48, a control data processor 50, a speech synthesizer 52, and one or more servo motors 54 to articulate appendages. Nevertheless, it will be understood that the controlled devices 42a–n need not include the speech synthesizer 52 and servo motors 54, and may alternatively or additionally include a wide range of other end effectors, such as pumps, heaters, vibration devices, lights, musical synthesizers, and the like.

The clock 46, which typically operates at 50 frames per second, triggers the controlled device 42a to read a frame of control data from the control data buffer 48 each clock cycle. Given the known frame rate of the clock 46, the control data is encoded into the encoded video signal 14' to maintain approximate synchronism between the controlled device 42a and the underlying video program in the encoded video signal 14'. Although this synchronism may be maintained by operating the clock 46 at the frame rate for the encoded video signal 14', it should be understood that the frame rate for the clock 46 could be different from the frame rate for the encoded video signal 14'. That is, the program developers can configure the control data to maintain approximate synchronism with the underlying video program so long they are aware of the both frame rates when encoding the control data signal into the underlying video signal to create the creating the encoded video signal 14'.

As a practical matter, the controlled devices 42a–n may operate at 50 frames per second, whereas a standard video device operates at 60 frames per second in part of the world, such as North America, and 50 frames per second in other parts of the world, such as Europe. Operating all of the controlled devices at 50 frames per second advantageously allows the same controlled devices to operate properly with both video standards. In addition, if one of the controlled devices 42a consumes data at slightly different rate than the encoded video signal 14' provides the control data, then the controlled device 42a may ignore control data frames from time to time (if the controlled device 42a consumes control data too quickly) or interpolate control data (if the controlled device 42a consumes control data too slowly) to maintain approximate synchronism.

A representative controlled device 42a receives control data from the wireless transmitter 40. The controlled device 42a identifies control data that is addressed to it and stores that control data in its control data buffer 48. The clock 46 triggers the control data processor 50 to read frames of control data from the control data buffer 48 at a frame rate that maintains approximate synchronism between the controlled device 42a and the underlying video program in the encoded video signal 14'. In response to each frame trigger, the control data processor 50 reads a frame of data from its control data buffer 48, parses the control data into data for various end effectors, if necessary, and passes the control data to the appropriate end effectors, which are represented by the speech synthesized 52 and the servo motors 54. This processing scheme causes the controlled device 41a to ignore control data that arrives when the control data buffer 48 full. In addition, as long as the control data buffer 48 contains control data, the controlled device 42 plays the current frame of data whenever the clock 46 generates a frame trigger.

The controlled device 42a responds to repeat control data frames in the control data signal by receiving a frame of control data from the wireless receiver 44 and determining whether the control data buffer 48 is full. If the control data buffer 48 is not full, the controlled device stores the frame of control data in the control data buffer and determines whether the frame of control data is designated as a repeat frame. If the frame is designated as a repeat frame, the controlled device determines whether the control data buffer 48 is full a second time—i.e., after the control data has been stored in the control data buffer the first time. If the control data buffer 48 is still not full, the controlled device stores the frame of control data in the control data buffer a second time.

The representative controlled device 42a is also configured to respond gracefully to control data shortages by checking its control data buffer 48 for the presence of a current frame of control data for producing an audible response signal. If the control data buffer 48 does not include a current frame of control data, the controlled device 42a retrieves a previous frame of control data for producing an audible response signal and replays the previous frame of control data at a reduced volume. The controlled device 42a then stores the previous frame of control data at the reduced volume in the control data buffer 48 as the current frame of control data. This allows the audio response generated by the controlled device 42a to fade out gradually, rather than terminating abruptly, when the control data terminates unexpectedly.

Figure 3:
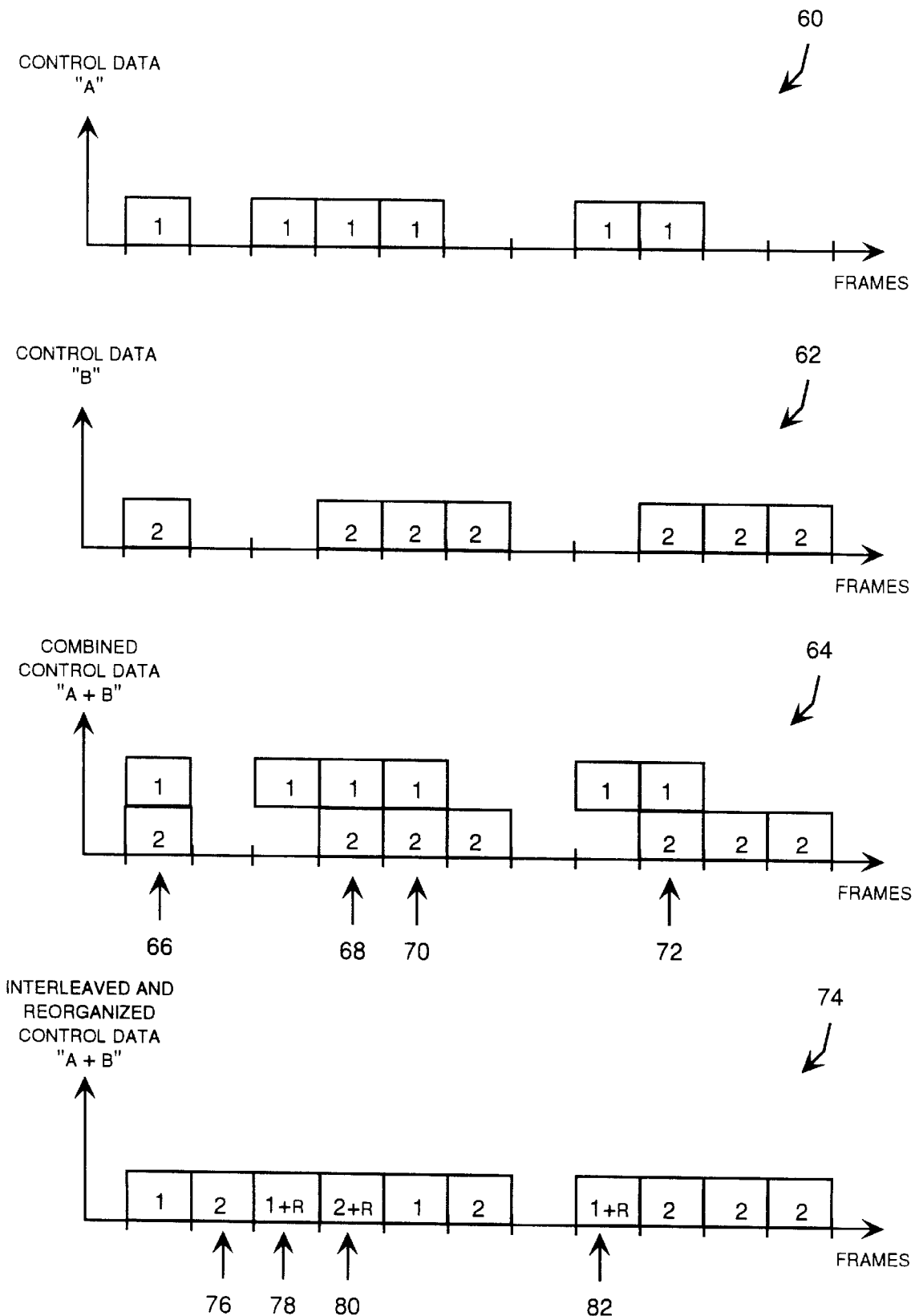
FIG. 3 is a data signal timing diagram illustrating the resolution of bandwidth conflicts in the creation of a unified control data signal.

FIG. 3 is a data signal timing diagram illustrating the resolution of bandwidth conflicts in the creation of the unified control data signal. This is a highly simplified example that illustrates the type of bandwidth conflicts that the BCR component 20 can resolve in two control data streams "A" and "B." It should be understood that the BCR component 20 can resolve similar bandwidth conflicts occurring in three, four, or more control data streams. That is, the basic bandwidth conflict resolution techniques illustrated in FIG. 3 can be extended to construct a unified control data signal from a larger number of device-specific control data streams.

Control data streams 60 and 62 illustrate portions of control data streams "A" and "B" to be transmitted two controlled devices during a time interval. Each control data stream typically includes LPC voice coefficients for the speech synthesizer 52 and movement coefficients for the servo motors 54, as well as addressing information indicating which controlled device is to receive the control data. The control data streams 60 and 62 are each divided into a plurality of frames that correspond to the frames of an associated video program. It will be appreciated, however, that the control data streams 60 and 62 may include other types control for other types of end effectors and need not correspond to the frames of an associated video program.

Because the control data streams 60 and 62 are to be transmitted on a single communication channel, only one frame of data can be transmitted during each frame. As shown in the combined control data stream 64, the control data streams 60 and 62 cannot be directly combined into a unified control data stream for the time interval because a number of frames are in conflict. That is, frames 66, 68, 70, and 72 include data from both control data streams 60 and 62.

A first one of these bandwidth conflicts is resolved in the unified control data signal 74 by reorganizing (i.e., time shifting) the frame 66 in control data stream 64 into the available frame 77 in the unified control data signal 74. The other bandwidth conflicts are resolved by interleaving the frames 68, 70, and 72 in control data stream 64 using the repeat frames 78, 80, and 82 in the unified control data signal 74.

The reorganizing (i.e., time shifting) type of bandwidth resolution technique can be extended to include pre-stuffing the control data buffer 48. Pre-stuffing the control data buffer 48 is possible because control data can be transmitted to the controlled device 42a faster than the controlled device can play the data. Stated differently, more than one frame of playable control data can be transmitted during each transmission frame. This allows a series of continuous frames of control data to be transmitted in advance so that they build up in the control data buffer 48 for use over several frames. It should be appreciated that pre-stuffing is an advantageous bandwidth resolution technique because, unlike repeat frames and other types of frame reorganization, pre-stuffing does not have an associated performance penalty. However, because the frames are not individually indexed and each controlled device operates on its own frame clock 46 (i.e., the controlled device plays a frame of data in its control data buffer 48 whenever that frame becomes the current frame), pre-stuffing is only available when a controlled device is scheduled to play a series of continuous frames.

It should be understood, however, that the frame control scheme described above could be altered by indexing each frame and synchronizing the frame index for each controlled device during initialization. Alternatively, a frame of control data could include a delay indicator indicating that a certain number of frames should be allowed to elapse before the control data for that frame is played. With this type of additional functionality, pre-stuffing will be enabled even for controlled devices that are not scheduled to play a series of continuous frames. In this case, a larger control data buffer or other type of storage device may be desirable for each controlled device. This will allow each controlled device to be pre-stuffed with a larger allocation of control data, which can subsequently be played in association with the correct frames.

FIGS. 4–8 are logic flow diagrams illustrating the operation of those components in the systems 10 and 30 that implement bandwidth conflict resolution. The description of these processes will also refer to the elements shown in FIGS. 1 and 2. It should be understood that the particular processed describe an illustrative embodiment of the present invention, and that those skilled in the art will appreciate how to modify this particular embodiment to construct the alternative embodiments in this specification.

Figure 4:
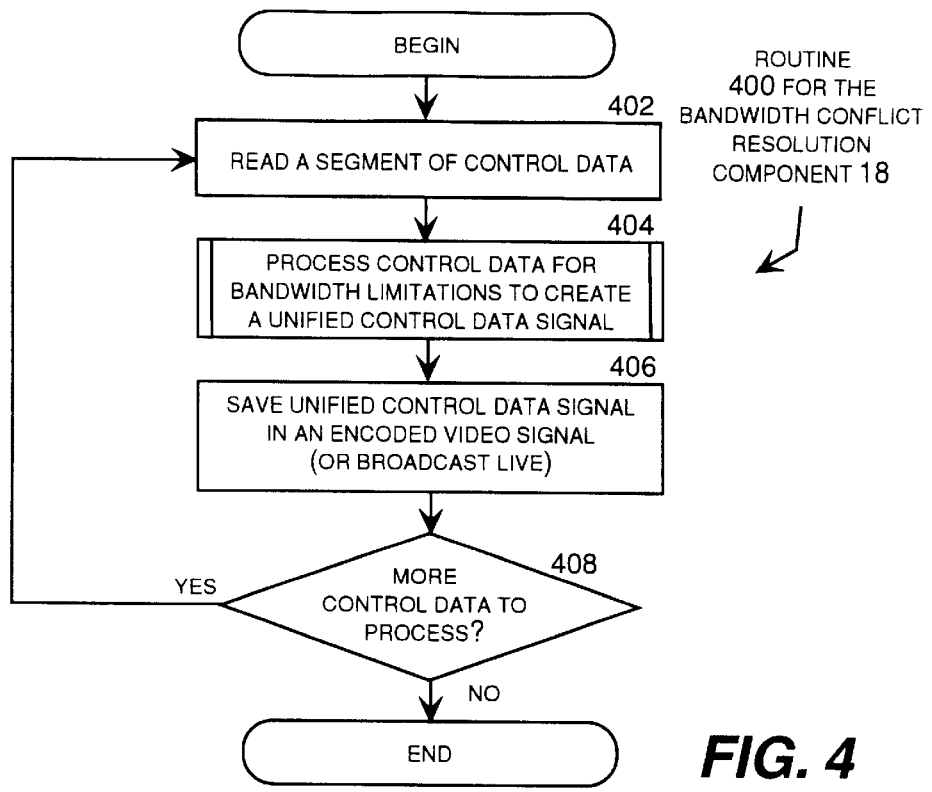
FIG. 4 is a logic flow diagram illustrating a method for creating a unified control data signal, which is incorporated into an encoded video signal.

FIG. 4 is a logic flow diagram illustrating a routine 400 performed by the BCR component 20 when creating the encoded video signal 14'. In step 402, the BCR component 20 reads a segment of control data, which typically includes multiple frames of data for multiple controlled devices. For example, a typical segment may include approximately 50 frames of the encoded video signal 14'. Step 402 is followed by routine 404, in which the BCR component processes the segment of control data to resolve any bandwidth conflicts. That is, the BCR component 20 combines the control data segments for multiple controlled devices to create a unified control data signal. Routine 404 is described in detail with reference to FIG. 6.

Routine 404 is followed by step 406, in which the BCR component 20 saves the unified control data signal, for example by storing the signal on video tape in the horizontal overscan region of a corresponding video program to create encoded video signal 14'. A suitable method and system for encoding the unified control data signal in the horizontal overscan region of a video signal is described in U.S. application Ser. No. 08/885,385 entitled METHOD AND SYSTEM FOR ENCODING DATA IN THE HORIZONTAL OVERSCAN PORTION OF A VIDEO SIGNAL filed on Jun. 30, 1997, which is assigned to a common assignee and incorporated into this specification by reference.

Alternatively, the encoded video signal 14' the BCR component 20 may output the encoded video signal 14' for immediate live broadcast. Step 406 is followed by step 408, in which the BCR component 20 determines whether there is more control data to process. If there is more control data to process, the "YES" branch loops to step 402, in which the BCR component 20 reads the next segment of control data. If there is no more control data to process, the "NO" branch is followed to the "END" step, which concludes routine 400.

Figure 5:
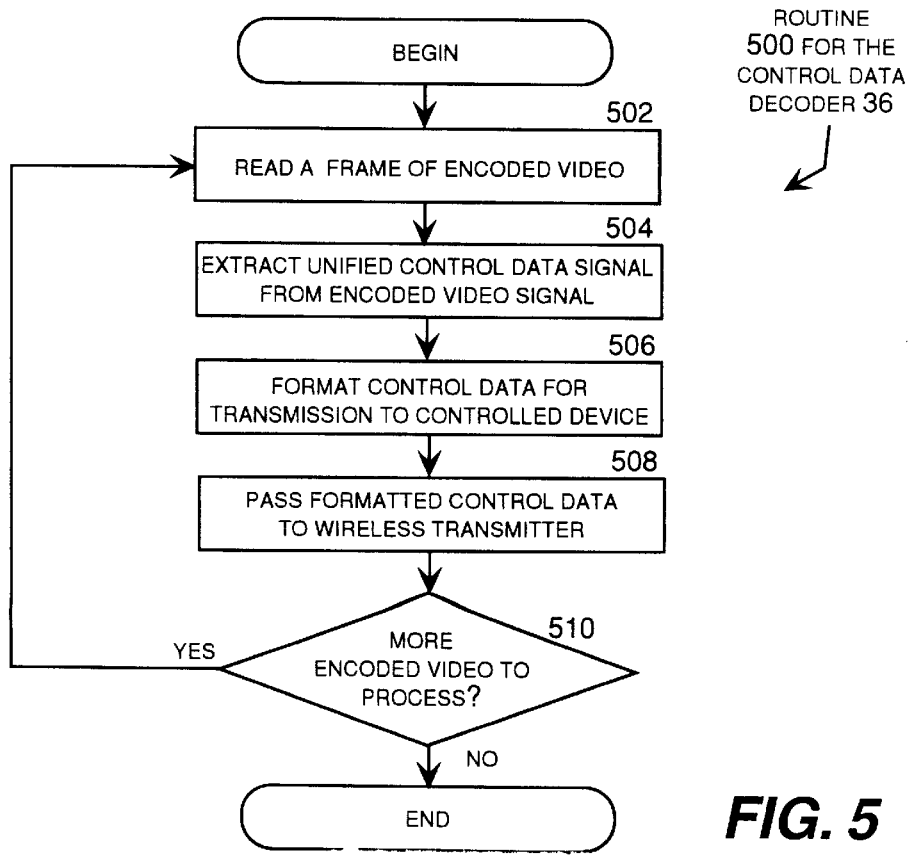
FIG. 5 is a logic flow diagram illustrating a method for decoding an encoded video signal.

FIG. 5 is a logic flow diagram illustrating a routine 500 performed by the control data decoder 36 when decoding the encoded video signal 14'. In step 502, the control data decoder 36 reads a frame of the encoded video signal 14'.

Step 502 is followed by step 504, in which the control data decoder 36 extracts the unified control data signal from the encoded video signal 14'. Step 504 is followed by step 506, in which the control data decoder 36 formats the unified control data signal for transmission to the controlled device. A suitable method and system for formatting the control data signal for transmission to the controlled device, which includes addressing the control data to the desired controlled devices 42a–n, is described in U.S. application Ser. No. 08/795,710 entitled "PROTOCOL FOR A WIRELESS CONTROL SYSTEM" filed on Feb. 4, 1997, which is assigned to a common assignee and incorporated into this specification by reference. In addition, suitable methods for engaging in bidirectional communications with the controlled devices 42a–n and for using data symbols to transfer control data to the controlled devices is described in U.S. application Ser. No. 08/794,921 entitled CONTROLLER AND ASSOCIATED MECHANICAL CHARACTERS OPERABLE FOR CONTINUOUSLY PERFORMING RECEIVED CONTROL DATA WHILE ENGAGING IN BIDIRECTIONAL COMMUNICATIONS OVER A SINGLE COMMUNICATIONS CHANNEL (as amended) filed on Feb. 4, 1997.

Step 506 is followed by step 508, in which the control data decoder 36 passes the formatted control data signal to the wireless transmitter 40 for transmission to the controlled devices 42a–n. Step 508 is followed by step 510, in which the control data decoder 36 determines whether there is more of the encoded video signal 14' to process. If there is more of the encoded video signal 14' to process, the "YES" branch loops to step 502, in which the control data decoder 36 reads the next frame of control data. If there is no more of the encoded video signal 14' to process, the "NO" branch is followed to the "END" step, which concludes routine 500.

Figure 6:
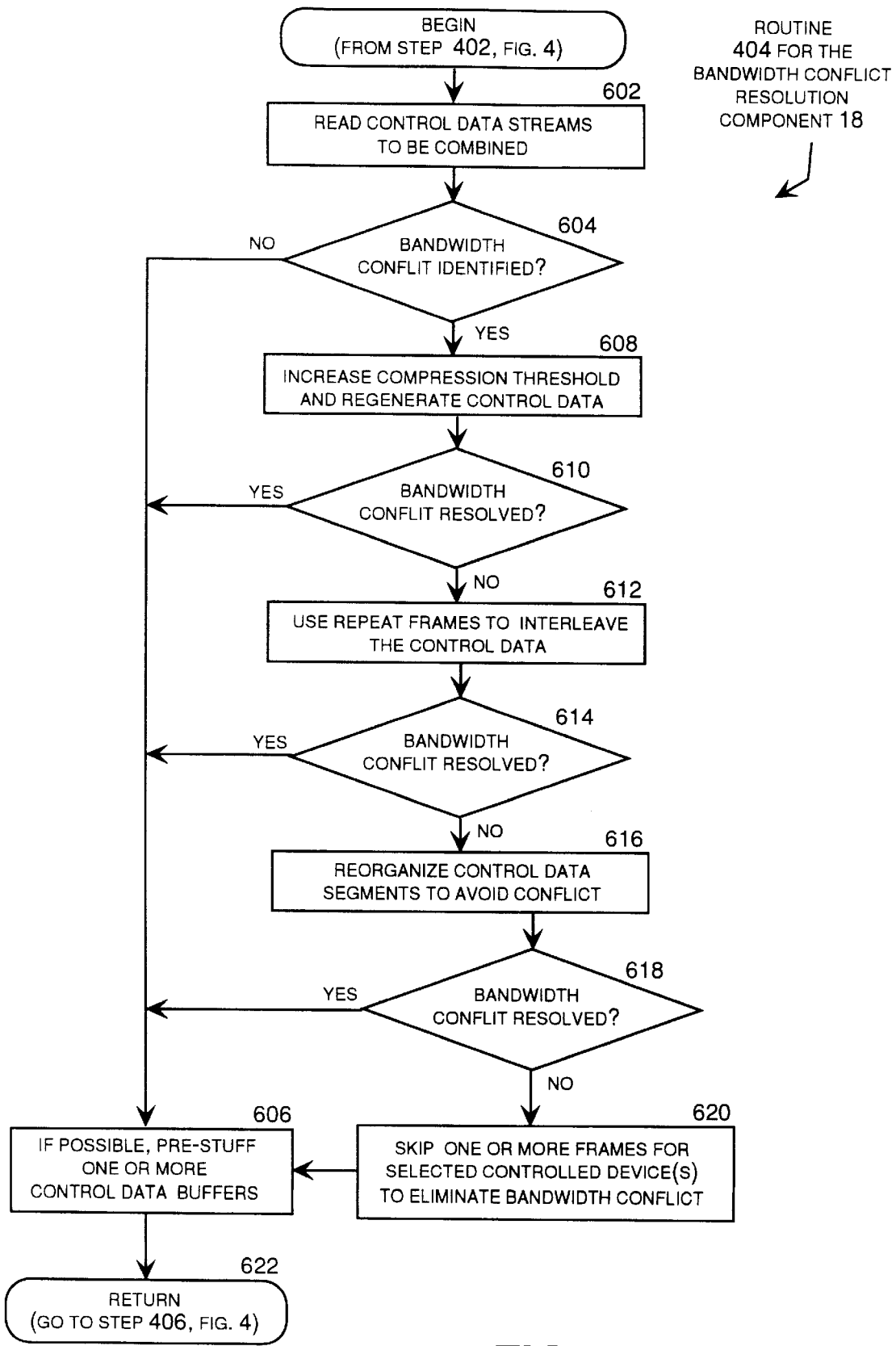
FIG. 6 is a logic flow diagram illustrating a method for resolving bandwidth conflicts when creating a unified control data signal.

FIG. 6 is a logic flow diagram illustrating a routine 404 performed by the BCR component 20 to resolve bandwidth conflicts when creating a unified control data signal. Routine 404 begins following step 402 shown on FIG. 4. In step 602, the BCR component 20 reads the control data streams for the various controlled devices to be combined. Step 602 is followed by step 604, in which the BCR component 20 determines whether a bandwidth conflict is identified in the control data. If a bandwidth conflict is not identified, the "NO" branch is followed to step 606, in which the BCR component 20 pre-stuffs one or more control data buffers, if possible. Step 606 is followed by the "RETURN" step, which returns to step 406 shown on FIG. 4.

Referring again to step 604, if a bandwidth conflict is identified, the "YES" branch is followed to step 608, in which the BCR component 20 regenerates the control data using a higher compression parameter for one or more of the control data streams. In particular, LPC audio compression may be performed by comparing two adjacent frames of LPC data. If the two adjacent frames can be made identical (or nearly identical) by changing a compression threshold for the LPC data in one or both frames, then both frames may be replaced by one frame designated as a repeat frame. Because an LPC frame may include many individual LPC coefficients, the compression threshold may be adjusted for some or all of the coefficients in a particular LPC frame.

Step 608 is followed by step 610, in which the BCR component 20 determines whether all bandwidth conflicts have been resolved. If all bandwidth conflicts have been resolved, the "YES" branch is followed to step 606, in which the BCR component 20 pre-stuffs one or more control data buffers, if possible.

If a bandwidth conflict remains, the "NO" branch is followed from step 610 to step 612, in which the BCR component 20 uses repeat frames to interleave the control data to resolve bandwidth conflicts. Step 612 is followed by step 614, in which the BCR component 20 again determines whether all bandwidth conflicts have been resolved. If all bandwidth conflicts have been resolved, the "YES" branch is followed to step 606, in which the BCR component 20 pre-stuffs one or more control data buffers, if possible.

If a bandwidth conflict remains, the "NO" branch is followed from step 614 to step 616, in which the BCR component 20 reorganizes the control data (i.e., time shifts one or more frames of control data) to resolve bandwidth conflicts. Step 616 is followed by step 618, in which the BCR component 20 again determines whether all bandwidth conflicts have been resolved. If all bandwidth conflicts have been resolved, the "YES" branch is followed to step 606, in which the BCR component 20 pre-stuffs one or more control data buffers, if possible.

If a bandwidth conflict remains, the "NO" branch is followed from step 618 to step 620, in which the BCR component 20 skips one or more frames of data for one or more selected controlled devices (i.e., data starves certain controlled devices) to resolve any remaining bandwidth conflicts. Step 660 is followed by step 606, in which the BCR component 20 pre-stuffs one or more control data buffers, if possible. Step 606 is followed by the "RETURN" step 622, which returns to step 406 shown on FIG. 4.

It should be appreciated that the bandwidth resolution techniques described above may be applied individualized or in various combinations and permutations, and that they may be applied in any order. Generally, however, pre-stuffing is applied whenever the control data allows this technique because pre-stuffing does not have an associated performance penalty.

In addition, the BCR component 20 typically selects controlled devices to data starve in step 620 in accordance with predefined selection criteria. For example, the BCR component 20 may data starve the minor characters in a particular scene in the corresponding video program, while minimizing the performance penalties applied to the main character or characters. Alternatively, the BCR component 20 may rotate performance penalties among controlled devices so that no particular device appears to perform significantly better than others. In general, the selection criteria may take into consideration the content of the corresponding video program as well as other factors, such as the sophistication of the various controlled devices, the need to keep all controlled devices operating reasonably well, the relative amount of control data to be performed by each controlled device, and so forth. The producers of controlled-device content material may identify other criteria that appear to be appropriate for a particular program.

Figure 7:
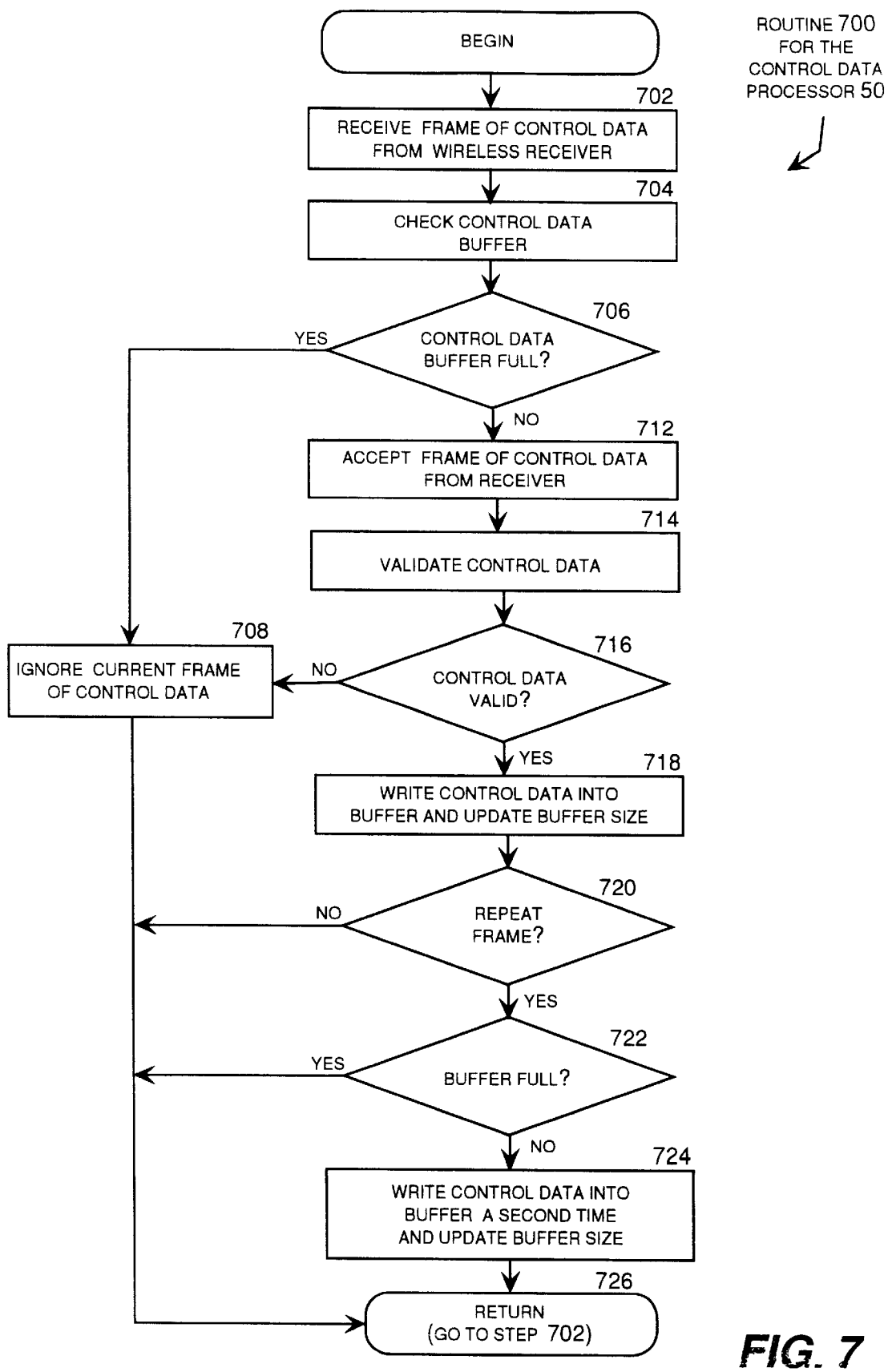
FIG. 7 is a logic flow diagram illustrating a method for responding to repeat frames in control data received by a controlled device.

FIG. 7 is a logic flow diagram illustrating a routine 700 performed by the control data processor 50 in a representative controlled device 42a for responding to repeat frames in control data received from the wireless transmitter 40. In step 702, the control data processor 50 receives a current frame of control data from the wireless transmitter 40, typically by reading a data register in the wireless receiver 44. Step 702 is followed by step 704, in which the control data processor 50 checks the control data buffer 48 to determine whether there is room in the buffer for the current frame of control data.

Step 704 is followed by step 706, in which the control data processor 50 determines whether the control data buffer 48 is full. If the control data buffer 48 is full, the "YES" branch is followed to step 708, in which the control data processor 50 ignores the current frame of control data. Step 708 is followed by the "RETURN" step, which typically returns to step 702. If the control data buffer 48 is not full, the "NO" branch is followed to step 712, in which the control data processor 50 accepts the current frame of data from the wireless receiver 44, typically by loading the current frame of control data into a register configured to receive the incoming control data.

Step 712 is followed by step 714, in which the control data processor 50 validates the current frame of control data, typically by applying a predefined checksum or other suitable type of validation technique. Step 714 is followed by step 716, in which the control data processor 50 determines whether the current frame of control data is valid. If the current frame of control data is invalid, the "NO" branch is followed to step 708, in which the control data processor 50 ignores the current frame of control data. If the current frame of control data is valid, the "YES" branch is followed to step 718, in which the control data processor 50 loads the current frame into the control data buffer 48 and updates (i.e., increases) the buffer size. The control data processor 50 subsequently reads the control data out of the control data buffer 48 in accordance with frame trigger signals generated by the clock 46. Each time the control data processor 50 reads a frame of data from the control data buffer 48, it updates (i.e., reduces) the buffer size.

Step 718 is followed by step 720, in which the control data processor 50 determines whether the current frame of control data is designated as a repeat frame, typically by checking the status of a predefined bit or other type of flag in the control data for the frame. If the current frame of control data is not designated as a repeat frame, the "NO" branch is followed to the "RETURN" step 726. If the current frame of control data is designated as a repeat frame, the "YES" branch is followed to step 722, in which the control data processor 50 again determines whether the control data buffer 48 is full (i.e., the control data processor 50 determines whether the control data buffer 48 is full after the current frame has been loaded into the buffer a first time).

If the control data buffer 48 is full, the "YES" branch is followed from step 722 to the "RETURN" step 726. If the control data buffer 48 is not full, the "NO" branch is followed to step 724, in which the control data processor 50 writes the current frame of control data into the control data buffer 48 a second time. Step 724 is followed by the "RETURN" step 726, which typically returns to step 702.

It should be appreciated that routine 700 allows the controlled devices 42a–n to identify repeat frames and store these frames twice in their control data buffers. This gives the speech synthesizer duplicate coefficients to play in response to the repeat frames. If the controlled device's data buffer is full, however, the repeat frames are simply ignored, which gives the controlled device an opportunity to "catch up" with its control data stream.

Figure 8:
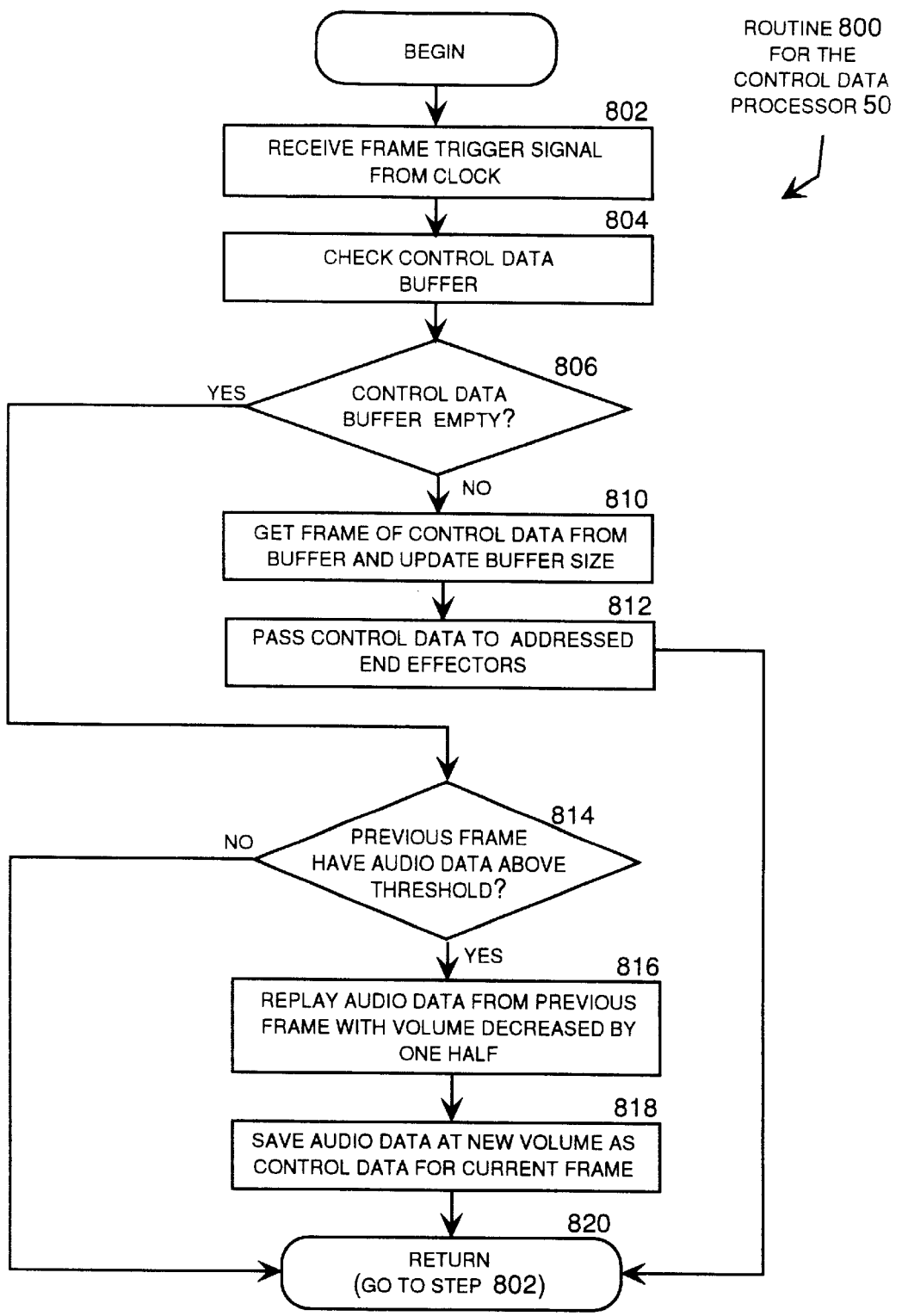
FIG. 8 is a logic flow diagram illustrating a method for gradually fading out the audio response in response to an abrupt termination of audio control data received by a controlled device.

FIG. 8 is a logic flow diagram illustrating a routine 800 performed by the control data processor 50 in a representative controlled device 42a for gradually fading out the audio response to an abrupt termination of audio control data received from the wireless transmitter 40. In step 802, the control data processor 50 receives a frame trigger signal from the clock 46, which triggers the control data processor 50 to read a frame of control data from the control data buffer 48 a frame rate that maintains approximate synchronism between the controlled device 42a and the underlying video program in the encoded video signal 14'. Step 802 is followed by step 804, in which the control data processor 50 checks the control data buffer 48 for a current frame of control data.

Step 804 is followed by step 806, in which the control data processor 50 determines whether the control data buffer 48 is empty. If the control data buffer is not empty, the "NO" branch is followed to step 810, in which the control data processor 50 reads the current frame of control data from the control data buffer 48 and updates (i.e., reduces) the size of the buffer. Step 810 is followed by step 812, in which the control data processor 50 passes the control data to the appropriate end effectors, represented by the speech synthesizer 52 and the servo motors 54.

Referring again to step 806, if the control data buffer is empty, the "YES" branch is followed to step 814, in which the control data processor 50 determines whether the previous frame of control data included audio data above a predetermined threshold. If the previous frame of control data did not include audio data above a predetermined threshold, the "NO" branch is followed to the "RETURN" step 820, which typically returns to step 802.

If the previous frame of control data happened to include audio data above a predetermined threshold, the "YES" branch is followed from step 814 to step 816, in which the control data processor 50 replays the audio data from the previous frame at half of the indicated volume. Step 816 is followed by step 818, in which the control data processor 50 stores the new volume as the volume of the current frame of data. Thus, this frame of control data at the reduced volume will be the control data for the previous frame of control data for the next iteration through routine 800. Step 818 is followed by the "RETURN" step 820, which typically returns to step 802.

It should be appreciated that routine 800 allows the controlled devices 42a–n to gradually fade out the audio response in response to abrupt or unexpected terminations of audio control data, such as those occurring when the control data transmitter is shut off suddenly. This gradual reduction of the audio response allows the response to fade out, rather than terminating abruptly with a loud "pop."

In view of the foregoing, it will be appreciated that the present invention provides a method for combining control data for multiple controlled devices into a control data signal that may be transmitted on a single communication channel. The invention also provides methods by which the controlled devices utilize this control data. It should be understood that the foregoing relates only to specific embodiments of the invention, and that numerous changes may be made therein without departing from the spirit and scope of the invention as defined by the following claims.

What is claimed is:

1. A computer-readable medium storing computer-executable instructions for performing the method of:
   receiving a first segment of control data for transmission to a first controlled device during a time interval;
   receiving a second segment of control data for transmission to a second controlled device during the time interval;
   combining the first and second segments of control data into a unified control data signal that is transmittable on a single communication channel during the time interval; and
   outputting the control data signal for transmission to the first and second controlled devices.

2. A computer-readable medium storing computer-executable instructions for performing the method of:
   receiving a first segment of control data for transmission to a first controlled device during a time interval;
   receiving a second segment of control data for transmission to a second controlled device during the time interval;
   combining the first and second segments of control data into a unified control data signal that is transmittable on a single communication channel during the time interval, wherein combining the first and second segments comprises:
      identifying a bandwidth conflict in the control data signal;
      regenerating the control data signal by increasing at least one compression parameter used in creating the first and second segments of control data; and
      determining whether the bandwidth conflict is resolved in the regenerated control data signal; and
   outputting the control data signal for transmission to the first and second controlled devices.

3. A computer-readable medium storing computer-executable instructions for performing the method of:
   receiving a first segment of control data for transmission to a first controlled device during a time interval;
   receiving a second segment of control data for transmission to a second controlled device during the time interval;
   combining the first and second segments of control data into a unified control data signal that is transmittable on a single communication channel during the time interval, wherein combining the first and second segments comprises:
      identifying a bandwidth conflict for the first and second segments of control data;
      interleaving the control data signal by replacing two adjacent frames of the first control data segment with a single frame designated as a repeat frame; and
      determining whether the bandwidth conflict is resolved in the interleaved control data signal; and
   outputting the control data signal for transmission to the first and second controlled devices.

4. A computer-readable medium storing computer-executable instructions for performing the method of:
   receiving a first segment of control data for transmission to a first controlled device during a time interval;
   receiving a second segment of control data for transmission to a second controlled device during the time interval;
   combining the first and second segments of control data into a unified control data signal that is transmittable on a single communication channel during the time interval, wherein combining the first and second segments comprises:
      identifying a bandwidth conflict in the control data signal;
      reorganizing the control data by moving a frame of the first control data segment into an unoccupied frame in the control data signal; and
      determining whether the bandwidth conflict is resolved in the reorganized control data signal; and
   outputting the control data signal for transmission to the first and second controlled devices.

5. A computer-readable medium storing computer-executable instructions for performing the method of:
   receiving a first segment of control data for transmission to a first controlled device during a time interval;
   receiving a second segment of control data for transmission to a second controlled device during the time interval;
   combining the first and second segments of control data into a unified control data signal that is transmittable on a single communication channel during the time interval, wherein combining the first and second segments comprises:
  identifying a bandwidth conflict in the control data signal;
  pre-stuffing the control data signal by moving a portion of the first control data segment to one or more frames in which the moved portion of the first control data segment will accumulate for delayed performance in a buffer in the first controlled device when the first control data segment is transmitted to the first controlled device; and
  determining whether the bandwidth conflict is resolved in the pre-stuffed control data signal; and
outputting the control data signal for transmission to the first and second controlled devices.

6. A computer-readable medium storing computer-executable instructions for performing the method of:
receiving a first segment of control data for transmission to a first controlled device during a time interval;
receiving a second segment of control data for transmission to a second controlled device during the time interval;
combining the first and second segments of control data into a unified control data signal that is transmittable on a single communication channel during the time interval, wherein combining the first and second segments comprises:
  identifying a bandwidth conflict in the control data signal;
  selecting one of the controlled device for data starving based on predefined selection criteria; and
  deleting one or more frames of the control data for the selected controlled device to resolve the bandwidth conflict; and
outputting the control data signal for transmission to the first and second controlled devices.

7. A computer-readable medium storing computer-executable instructions for performing the method of:
receiving a first segment of control data for transmission to a first controlled device during a time interval;
receiving a second segment of control data for transmission to a second controlled device during the time interval;
combining the first and second segments of control data into a unified control data signal that is transmittable on a single communication channel during the time interval, wherein combining the first and second segments comprises:
  identifying a bandwidth conflict in the control data signal;
  regenerating the control data signal by increasing at least one compression parameter used in creating the first and second segments of control data;
  determining whether the bandwidth conflict is resolved in the regenerated control data signal; and
  if the bandwidth conflict is not resolved in the regenerated control data signal,
    interleaving the control data signal by replacing two adjacent frames of the first control data segment with a single frame designated as a repeat frame, and
    determining whether the bandwidth conflict is resolved in the interleaved control data signal; and
outputting the control data signal for transmission to the first and second controlled devices.

8. The computer-readable medium of claim 7, wherein the step of combining the first and second segments of control data into the unified control data signal further comprises the steps of:
  if the bandwidth conflict is not resolved in the interleaved control data signal,
    reorganizing the control data by moving a frame of the first control data segment into an unoccupied frame in the control data signal, and
    determining whether the bandwidth conflict is resolved in the reorganized control data signal.

9. The computer-readable medium of claim 8, wherein the step of combining the first and second segments of control data into the unified control data string further comprises the steps of:
  if the bandwidth conflict is not resolved in the reorganized control data signal,
    pre-stuffing the control data signal by moving a portion of the first control data segment to one or more frames in which the moved portion of the first control data segment will accumulate for delayed performance in a buffer in the first controlled device when the first control data segment is transmitted to the first controlled device, and
    determining whether the bandwidth conflict is resolved in the prestuffed control data signal.

10. The computer-readable medium of claim 9, wherein the step of combining the first and second segments of control data into the unified control data string further comprises the steps of:
  if the bandwidth conflict is not resolved in the pre-stuffed control data signal,
    selecting one of the controlled device for data starving based on predefined selection criteria; and
    deleting one or more frames of the control data for the selected controlled device to resolve the bandwidth conflict.

11. A computer-readable medium storing computer-executable instructions for performing the method of:
receiving a first segment of control data for transmission to a first controlled device during a time interval;
receiving a second segment of control data for transmission to a second controlled device during the time interval;
combining the first and second segments of control data into a unified control data signal that is transmittable on a single communication channel during the time interval;
outputting the control data signal for transmission to the first and second controlled devices; and
transmitting the unified control data signal to the first and second controlled devices in approximate synchronism with the display of a video program on a display device and causing the first and second controlled devices to behave as characters in the video program.

12. A computer-readable medium storing computer-executable instructions for performing the method of:
receiving a first segment of control data for transmission to a first controlled device during a time interval;
receiving a second segment of control data for transmission to a second controlled device during the time interval;
combining the first and second segments of control data into a unified control data signal that is transmittable on a single communication channel during the time interval;
outputting the control data signal for transmission to the first and second controlled devices; and
storing the unified control data signal on a video tape in approximate synchronism with a video program so that the control data may be read from the video tape and transmitted to the first and second controlled devices, while the video program is a display device, to cause the first and second controlled devices to behave as characters in the video program.

13. A control data signal, propagating or stored on a computer-readable medium, comprising:

a first control data segment transmitted to a first controlled device during a time interval;

a second control data segment transmitted to a second controlled device during the time interval;

the first and second control data segments being combined into the control data signal and transmitted on a single communication channel during the time interval; and the control data signal comprising interleaved control data frames in which two adjacent frames of the first control data segment have been replaced by a single frame designated as a repeat frame to resolve a bandwidth conflict in the control data signal.

14. The control data signal of claim 13, further comprising:

reorganized control data in which a frame of the first control data segment has been moved into an unoccupied frame in the control data signal to resolve a bandwidth conflict in the control data signal.

15. The control data signal of claim 13, further comprising:

pre-stuffed control data in which a portion of the first control data segment has been moved to one or more frames in which the moved portion of the first control data segment will accumulate for delayed performance in a buffer in the first controlled device when the first control data segment is received by the first controlled device.

16. The control data signal of claim 13, further comprising:

interleaved control data frames in which two adjacent frames of the first control data segment have been replaced by a single frame designated as a repeat frame to resolve a bandwidth conflict in the control data signal; and reorganized control data in which a frame of the first control data segment has been moved into an unoccupied frame in the control data signal to resolve a bandwidth conflict in the control data signal.

17. The control data signal of claim 16, further comprising:

pre-stuffed control data in which a portion of the first control data segment has been moved to one or more frames in which the moved portion of the first control data segment will accumulate for delayed performance in a buffer in the first controlled device when the first control data segment is received by the first controlled device.

18. The control data signal of claim 13 propagating in approximate synchronism with the display of a video program on a display device and causing the first and second controlled devices to behave as characters in the video program.

19. The control data signal of claim 13 encoded in the horizontal overscan of a video signal and stored on video tape in approximate synchronism with a video program so that, when the video tape is played, the control data signal may be read from the video tape and transmitted in approximate synchronism with the display of the video program on a display device to causing the first and second controlled devices to behave as characters in the video program.

20. A controlled device configured for responding to control data by performing the steps of:

receiving a frame of control data;

determining whether a control data buffer is full; and if the control data buffer is not full,
storing the frame of control data in the control data buffer,
determining whether the frame of control data is designated as a repeat frame, and
if the frame of control data is designated as a repeat frame,
determining whether the control data buffer is full after the control data has been stored in the control data buffer, and
if the control data buffer is not full after the control data has been stored in the control data buffer, storing the frame of control data in the control data buffer a second time.

21. A controlled device configured for synthesizing audible response signals in response to control data by performing the steps of:

checking a control data buffer for the presence of a current frame of control data for producing an audible response signal; and if the control data buffer does not include the current frame of control data,
retrieving a previous frame of control data for producing an audible response signal,
replaying the previous frame of control data at a reduced volume, and storing the previous frame of control data at the reduced volume in the control data buffer as the current frame of control data.

* * * * *